United States Patent
Mäder et al.

(10) Patent No.: US 12,436,811 B2
(45) Date of Patent: Oct. 7, 2025

(54) OPTIMIZING OPERATION OF HIGH-PERFORMANCE COMPUTING SYSTEMS

(71) Applicant: HEWLETT PACKARD ENTERPRISE DEVELOPMENT LP, Spring, TX (US)

(72) Inventors: Jan Maximilian Mäder, Fort Collins, CO (US); Christian Simmendinger, Baden-Württemberg (DE); Tobias Walter Wolfgang Schiffmann, Baden-Württemberg (DE); Torsten Wilde, Berlin (DE)

(73) Assignee: Hewlett Packard Enterprise Development LP, Spring, TX (US)

( * ) Notice: Subject to any disclaimer, the term of this patent is extended or adjusted under 35 U.S.C. 154(b) by 483 days.

(21) Appl. No.: 17/948,159

(22) Filed: Sep. 19, 2022

(65) Prior Publication Data
US 2024/0095081 A1 Mar. 21, 2024

(51) Int. Cl.
*G06F 9/50* (2006.01)
*G06F 11/34* (2006.01)

(52) U.S. Cl.
CPC ............ *G06F 9/505* (2013.01); *G06F 9/5044* (2013.01); *G06F 11/3428* (2013.01); *G06F 2201/80* (2013.01); *G06F 2209/5019* (2013.01); *G06F 2209/505* (2013.01)

(58) Field of Classification Search
None
See application file for complete search history.

(56) References Cited

U.S. PATENT DOCUMENTS

| | | |
|---|---|---|
| 9,135,741 B2 | 9/2015 | Li et al. |
| 9,323,628 B2 | 4/2016 | Ngo et al. |
| 9,967,146 B2 | 5/2018 | Franke et al. |
| (Continued) | | |

OTHER PUBLICATIONS

Fekry, Ayat et al. "Towards Seamless Configuration Tuning of Big Data Analytics". IEEE 39th International Conference on Distributed Computing Systems (ICDCS). Oct. 2019.*
(Continued)

*Primary Examiner* — Adam Lee
(74) *Attorney, Agent, or Firm* — Jones Robb PLLC

(57) ABSTRACT

A method for optimizing operations of high-performance computing (HPC) systems includes collecting data associated with a plurality of workload performance profiling counters associated with a workload during runtime of the workload in an HPC system. Based on the collected data, the method includes using a machine-learning technique to classify the workload by determining a workload-specific fingerprint for the workload. The method includes identifying an optimization metric to optimize during running of the workload in the HPC system. The method includes determining an optimal setting for a plurality of tunable hardware execution parameters as measured against the optimization metric by varying at least a portion of the plurality of tunable hardware execution parameters. The method includes storing the workload-specific fingerprint, the optimization metric, and the optimal setting for the plurality of tunable hardware execution parameters as measured against the optimization metric in an architecture-specific knowledge database.

20 Claims, 6 Drawing Sheets

(56) References Cited

U.S. PATENT DOCUMENTS

| | | | |
|---|---|---|---|
| 10,228,973 B2* | 3/2019 | Cui | G06F 9/50 |
| 10,528,115 B2 | 1/2020 | Deng et al. | |
| 10,698,706 B1* | 6/2020 | Rabe | G06F 3/0484 |
| 10,853,148 B1* | 12/2020 | Kenney | G06F 9/4881 |
| 11,005,766 B1* | 5/2021 | Ni | H04L 41/083 |
| 11,194,688 B1* | 12/2021 | Featonby | G06F 11/004 |
| 11,329,890 B2 | 5/2022 | Pampaiah et al. | |
| 11,397,658 B1* | 7/2022 | Pang | G06F 11/3433 |
| 11,875,191 B1* | 1/2024 | Plenderleith | H04W 64/003 |
| 11,886,926 B1* | 1/2024 | Gadalin | G06F 9/4856 |
| 11,941,454 B1* | 3/2024 | Gupta | G06F 9/45533 |
| 12,045,664 B1* | 7/2024 | Wang | G06F 9/5077 |
| 2005/0223026 A1* | 10/2005 | Chaudhuri | G06F 16/24556 |
| 2006/0085368 A1* | 4/2006 | Moilanen | G06N 3/126 706/45 |
| 2007/0094163 A1* | 4/2007 | Bowerman | G06N 3/126 706/13 |
| 2007/0198750 A1* | 8/2007 | Moilanen | G06F 9/5083 710/6 |
| 2007/0245163 A1 | 10/2007 | Lu et al. | |
| 2009/0089554 A1* | 4/2009 | Blackmon | G06F 11/3466 712/E9.028 |
| 2011/0154003 A1* | 6/2011 | Carrizo | G06F 11/3452 713/1 |
| 2013/0185729 A1 | 7/2013 | Vasic et al. | |
| 2014/0074872 A1* | 3/2014 | Amin | G06F 16/217 707/758 |
| 2016/0246647 A1* | 8/2016 | Harris | G06F 9/5027 |
| 2017/0017513 A1* | 1/2017 | Theurer | G06F 9/505 |
| 2017/0052586 A1* | 2/2017 | Nejedlo | G06F 1/28 |
| 2017/0093639 A1* | 3/2017 | Dabbagh | H04L 41/12 |
| 2017/0115878 A1* | 4/2017 | Dewaikar | G06F 3/0689 |
| 2017/0161093 A1* | 6/2017 | Frazier | G06F 9/45533 |
| 2017/0180220 A1* | 6/2017 | Leckey | H04L 41/122 |
| 2017/0262314 A1* | 9/2017 | Cui | G06F 9/505 |
| 2018/0006903 A1* | 1/2018 | Ganguli | H04L 41/5019 |
| 2018/0027093 A1* | 1/2018 | Guim Bernat | H04L 43/0876 709/221 |
| 2018/0113965 A1* | 4/2018 | Harris | G06F 9/5066 |
| 2018/0150330 A1* | 5/2018 | Bernat | G06F 3/0641 |
| 2018/0165238 A1* | 6/2018 | Depew | G06F 11/349 |
| 2018/0210530 A1* | 7/2018 | Kwon | G06F 1/3206 |
| 2018/0293697 A1* | 10/2018 | Ray | G06F 9/3888 |
| 2019/0034326 A1* | 1/2019 | Nalluri | G06T 1/60 |
| 2019/0042129 A1* | 2/2019 | Tarango | G06F 11/3034 |
| 2019/0163538 A1* | 5/2019 | Klein | G06F 9/45558 |
| 2019/0163627 A1* | 5/2019 | Asadi | G06F 3/06 |
| 2019/0188025 A1* | 6/2019 | Anderson | G06F 3/067 |
| 2019/0324799 A1* | 10/2019 | Metsch | G06N 20/00 |
| 2019/0334786 A1* | 10/2019 | Dutta | H04L 67/1097 |
| 2019/0334801 A1* | 10/2019 | Dutta | H04L 43/16 |
| 2019/0334802 A1* | 10/2019 | Dutta | G06F 11/3452 |
| 2020/0050494 A1* | 2/2020 | Bartfai-Walcott | G06F 9/5061 |
| 2020/0125411 A1* | 4/2020 | Goodman | G06F 9/505 |
| 2020/0125545 A1* | 4/2020 | Idicula | G06N 20/20 |
| 2020/0133707 A1* | 4/2020 | Coster | G06F 1/329 |
| 2020/0142735 A1* | 5/2020 | Maciocco | G06F 21/6209 |
| 2020/0233724 A1* | 7/2020 | Schmidt | G06F 11/3466 |
| 2020/0278870 A1* | 9/2020 | Saravanan | G06F 9/44505 |
| 2020/0310851 A1* | 10/2020 | Featonby | G06F 9/5027 |
| 2020/0310852 A1* | 10/2020 | Featonby | G06F 9/45558 |
| 2020/0310853 A1* | 10/2020 | Featonby | G06F 9/45558 |
| 2020/0310876 A1* | 10/2020 | Featonby | G06F 9/5088 |
| 2020/0314171 A1* | 10/2020 | Featonby | G06F 9/45558 |
| 2020/0393971 A1* | 12/2020 | Dutta | G06F 3/0653 |
| 2021/0116982 A1* | 4/2021 | Khanna | G06F 1/26 |
| 2021/0117118 A1* | 4/2021 | Stoica | G06F 3/0604 |
| 2021/0119935 A1* | 4/2021 | Metsch | H04L 41/5003 |
| 2021/0149592 A1* | 5/2021 | Papandreou | G06F 9/5033 |
| 2021/0240589 A1* | 8/2021 | Samuel | G06F 8/65 |
| 2021/0303045 A1* | 9/2021 | Leung | G06F 1/3228 |
| 2021/0306232 A1* | 9/2021 | Sousa | H04L 41/5054 |
| 2021/0365302 A1 | 11/2021 | Lange et al. | |
| 2021/0367855 A1 | 11/2021 | Pampaiah et al. | |
| 2021/0373973 A1* | 12/2021 | Ekins | G06F 3/0604 |
| 2021/0374152 A1 | 12/2021 | Kougkas et al. | |
| 2022/0012089 A1 | 1/2022 | Nasr-Azadani et al. | |
| 2022/0012105 A1* | 1/2022 | Chagam Reddy | G06F 3/0629 |
| 2022/0043695 A1* | 2/2022 | Gallegos | G06F 3/0605 |
| 2022/0156114 A1* | 5/2022 | Nagpal | G06F 11/3409 |
| 2022/0221925 A1* | 7/2022 | Wang | G06F 11/3438 |
| 2022/0229698 A1* | 7/2022 | Lo | G06F 9/4881 |
| 2022/0365821 A1* | 11/2022 | Darji | G06F 21/64 |
| 2023/0017085 A1* | 1/2023 | Vera Sousa | G06F 9/5083 |
| 2023/0111378 A1* | 4/2023 | Sousa | G06N 3/088 706/21 |
| 2024/0403131 A1* | 12/2024 | Eker | H04L 41/16 |

OTHER PUBLICATIONS

Khanna, Rahul et al. "Autonomic Characterization of Workloads Using Workload Fingerprinting". IEEE International Conference on Cloud Computing in Emerging Markets (CCEM). Jan. 2015.*

Gupta, Piyush et al. "Analytic technique for optimal workload scheduling in data-center using phase detection". 5th International Conference on Energy Aware Computing Systems & Applications. Dec. 2015.*

Fekry, Ayat. "Optimizing Data-Intensive Computing with Efficient Configuration Tuning". University of Cambridge dissertation. Jul. 2020.*

Eastep, J., et al., "Global Extensible Open Power Manager. A Vehicle for HPC Community Collaboration on Co-Designed Energy Management Solutions", vol. 10266, May 12, 2017, pp. 394-412.

GEOPM Working Group, "GEOPM Service Documentation", retrieved from: https://geopm.github.io/, retrieved on: 2021. p. 1.

Reorda, M.S., et al., "Analysis and dynamic optimization of energy consumption on HPC applications based on real-time metrics", Politecnico Di Torino, Oct. 2017, pp. 70.

Wang, B., et al., "Performance Prediction for Power-Capped Applications based on Machine Learning Algorithms", IEEE Org, Sep. 9, 2020.

* cited by examiner

OPTIMIZING OPERATION OF HIGH-PERFORMANCE COMPUTING SYSTEMS

BACKGROUND

High-performance computing (HPC) systems aggregate computing power to deliver significantly higher performance than can be achieved by a typical solitary computer or workstation. Often, HPC systems network multiple computing devices, also referred to as nodes, together to create a high-performance architecture. Applications (e.g., containing algorithms and software programs) are executed concurrently on the networked computing devices resulting in increased performance relative to that which could be achieved by a single device.

BRIEF DESCRIPTION OF THE DRAWINGS

Various examples will be described below with reference to the following figures.

Figure 1:
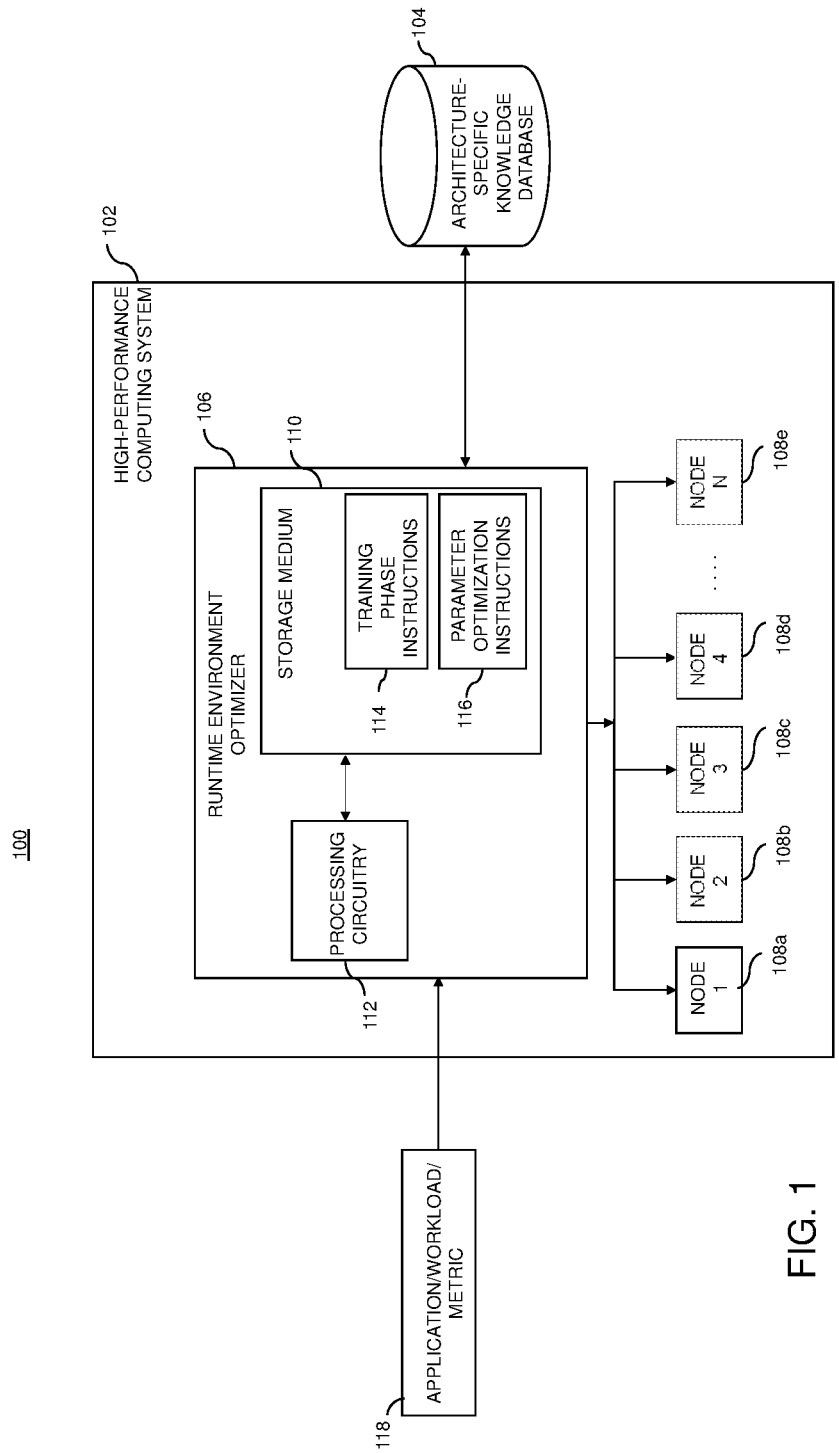
FIG. 1 is a block diagram of an example HPC system in accordance with some implementations of the present disclosure.

Throughout the drawings, identical reference numbers designate similar, but not necessarily identical, elements. Moreover, the drawings provide examples and/or implementations consistent with the description; however, the description is not limited to the examples and/or implementations provided in the drawings.

DETAILED DESCRIPTION

As previously stated, high-performance computing (HPC) systems aggregate computing power to deliver appreciably higher performance than can be achieved by a single typical computing device. While offering improvements in performance, one problem faced by many HPC systems is that they can use large amounts of energy. Consequently, the cost of operating an HPC system can be high, especially in view of increasing energy costs. Moreover, some HPC systems may be overprovisioned, meaning the amount of electrical power the system can draw ("peak system power") may exceed the amount of power that can be supplied to the system ("available power"), e.g., either because power supply or delivery hardware is unable to meet the peak system power demand or because policies set by a user or governing body restrict the available power. While one can reduce the power consumption of an HPC system, for example by instituting a power cap, this often comes at the cost of decreased system performance leading to longer job completion times. Thus, to allow for an optimum balance of power consumption and system performance, in examples disclosed herein instead of merely limiting the amount of power used by the system, tunable hardware parameters of the system (e.g., CPU frequency, GPU frequency, and/or other hardware parameters) are adjusted so as to produce a desired balance of power consumption and performance.

Other approaches have been used to try to optimize certain aspects of HPC systems to balance performance and power consumption, but such prior attempts can have significant drawbacks. For example, some approaches to optimizing an HPC system may involve a substantial compute time overhead, which may offset much of the gains in system performance or reductions in energy usage obtained by the optimization. Moreover, many such approaches may operate without any memory of prior optimization efforts, resulting in the optimization needing to be repeated each time any workload is run (as each workload may affect the system differently and thus may need different settings to achieve optimal results), and this repetition of the optimization process each time a workload is run is inefficient. While some approaches may have memory of past optimizations to avoid such inefficient repetition of the optimization process when the same application is run again, these approaches may be dependent upon the system having explicit knowledge of the particular application, use-case, and/or workload being run, which may increase difficulty of use (e.g., as a user may need to determine and specify the application, use-case, and workload in advance). Moreover, these approaches offer little or no help when applications, use-cases, or workloads are encountered that have not previously been optimized. Another problem with prior approaches to optimizing HPC performance is that some are node-specific, but settings that are optimal for one node may not be optimal for other nodes in the system or for the system as a whole, particularly for certain HPC systems in which some nodes running an application/workload may be slightly different from others. In addition, a problem with some prior approaches is that they are geared toward optimizing a single parameter, but as a result, they may not necessarily provide the best results in systems in which multiple hardware parameters may affect power consumption and performance. As such, improved techniques for optimizing the operation of HPC systems are desired.

The technology described herein solves the problems noted above by efficiently determining optimal settings of multiple tunable hardware parameters (e.g., CPU frequency, GPU frequency, and/or similar tunable hardware parameters) for a wide variety of workloads. Examples disclosed herein utilize an unsupervised machine learning (ML) technique to classify workloads into workload classes based on their observed behavior (i.e., based on certain workload performance profiling counters, such as cache hits, cache misses, FLOPS, or other performance counters), and then optimal parameter settings are determined for the workload classes. What is considered optimal may be defined according to a predetermined or user-specified optimization metric, such as greatest energy efficiency (greatest performance per watt), greatest performance at a given power cap, lowest power usage at a given performance floor, or other similar optimization metrics. The optimal settings of the hardware parameters for a given workload class may be determined, for example, by varying settings of the hardware parameters while a workload that is representative of the class is being run and measuring the resulting system performance to find the combination of settings producing the best results (best being defined according to the metric).

Thereafter, when the HPC system runs a particular workload, the system may determine which workload class the particular workload is a member of by applying the same ML techniques, and then the optimal settings of the hardware parameters that were previously determined for that workload class can be set for each node within the HPC system while the system runs the particular workload. The examples described herein thus provide an optimized runtime environment for the execution of the particular workload and, accordingly, provide for optimized operation of the HPC system.

Thus, in examples disclosed herein, the computationally expensive process of determining optimal settings of hardware parameters for a given workload need not be repeated for each workload that is run in the HPC system. Instead, the process of determining optimal settings can be performed relatively few times (e.g., once for each of the workload classes), and then when particular workloads are encountered, the system can perform the relatively less intensive process of identifying the class to which the particular workload belongs and looking up the previously determined optimal parameters settings for that workload class. Thus, the excessive computational overhead and inefficiency of prior approaches can be avoided, thereby improving the performance of the HPC system. In addition, the optimal settings can be determined for each workload without the system requiring explicit knowledge of the particular application, use case, or workload in advance. Instead, the applications can be classified based on their during runtime, even if the particular application or workload has never been encountered before. Moreover, the optimal settings are usable for all nodes in the system, rather than being node-specific, thus allowing for better performance of the overall system. Furthermore, because multiple hardware parameters are simultaneously optimized in examples disclosed herein, the optimization may produce better results in systems that have more than one tunable hardware parameter (which includes most HPC systems) than in prior approaches that may optimize just one parameter.

The information that characterizes the workload classes (e.g., fingerprints associated therewith) and the optimal parameter settings for each of the classes may be stored in a knowledge database. In some examples, the database may be made available to multiple HPC systems having a similar architecture, allowing all of these systems to use the class information and optimal parameter settings stored therein. This provides even more efficiencies, as only one of the systems may need to perform the process of determining the optimal settings for the workload classes, while many systems can benefit from this information by simply accessing the shared knowledge database. More detail regarding how the systems may classify the workloads and determine optimal parameter settings for the classes are described in greater detail below.

As used herein, to "optimize" or render a runtime environment, an HPC system, etc. "optimized" or "optimal" refers to enabling a set of conditions that make the HPC system, runtime environment, etc. as effective as possible when measured against a particular performance characteristic. The runtime environment (and, accordingly, the HPC system) may be optimized for a number of performance characteristics referred to herein as "optimization metrics" or "optimization policies" or as being "based on" optimization metrics/policies. By way of example, and not limitation, optimization metrics may include optimal energy efficiency (e.g., measured in instructions per watt), minimal energy/power consumption (for instance, given a particular workload performance floor), maximum workload performance (for instance, given a particular power cap), minimum workload runtime, or any other performance-based characteristic. In some examples, the optimization metric/policy used to optimize the runtime environment may be specified (e.g., by a user), and may be changed as desired from one runtime environment to another. In other examples, an optimization metric/policy may be predetermined (e.g., by a manufacturer of the system) and used for all runtime environments. Optical settings of parameters are settings that produce the aforementioned optimized runtime environment.

In some examples, the ML technique used in examples disclosed herein comprises a clustering technique, and the aforementioned classes of workloads may correspond to clusters identified by the clustering technique. While the examples described throughout the present disclosure sometimes refer to the ML technique of clustering, it will be understood by those having ordinary skill in the art that other ML techniques (for instance, deep neural networks, random decision forests, or other known ML techniques) may be utilized within the scope of the present disclosure.

The process of identifying workload classes, determining optimal parameter settings for the workload classes, and building the knowledge database may be referred to as a training phase. The knowledge database that is created during the training phase may be site- or architecture-specific (i.e., specific to the HPC system architecture being trained), as different architectures may respond differently to workloads and thus optimal parameter settings may not translate across architectures. The architecture-specific knowledge database may be created by running a plurality of benchmark workloads (e.g., causing one or more applications to perform one or more jobs, each of the jobs comprising one or more of the benchmark workloads) to simulate various runtime conditions.

Various workload performance profiling counters associated with the various benchmark workloads may be observed, and the workloads may be classified based on their workload performance profiling counters. The observed counters and the classifications may be recorded in the architecture-specific knowledge database. In addition, as the benchmark workloads are run in the HPC system, the values for at least a portion of the available tunable hardware execution parameters may be varied from time to time within the performance of a given workload and/or from one workload execution to another (which can include repeating the same workload multiple times with different settings for the parameters during each run).

The system performance characteristics of interest (as defined by the optimization metric being used) may be monitored for each set of values used for the parameters, and from this, one or more optimal sets of parameter settings may be identified for each class of workload. Each optimal set of parameter settings for a given workload class may be the one that produces the best results in the benchmark runs associated with that workload class as judged according to a corresponding one of the optimization metrics. In some examples, multiple optimization metrics are considered and thus each workload class may have multiple sets of optimal parameter settings, i.e., one per optimization metric. The optimal parameter settings may then be stored in the architecture-specific knowledge database in association with identification information of workload class and the particular optimization metric.

In the training phase, workload performance profiling counters are observed. Specifically, during one or more periods in the runtime of each benchmark workload, after a steady application state is reached (or is assumed to have been reached), the workload performance profiling counters are observed and recorded. "Workload performance profiling counters" generally may assist in identifying and/or classifying at least one of a workload, the performance of a workload, and/or the power consumption of a workload. By way of example, and not limitation, workload performance profiling counters may include at least one of a cache-hits counter, a cache-misses counter, a translation look asides counter, a buffer hits counter, a buffer misses counter, a memory stores counter, a memory load counter, a loads to stores ratio counter, a power consumption counter, and/or a flops counter.

Data pertaining to workload performance profiling counters may include an identification of one or more workload performance profiling counters as well as associated values under certain runtime conditions. Based on workload performance profiling counter data, a workload-specific fingerprint for each benchmark workload may be determined. The workload-specific fingerprint refers generally to the workload performance counters measured for the workload (or a subset thereof), or to a set of values derived therefrom. While not identifying a workload outright, a workload-specific fingerprint may be utilized to classify a workload based on its runtime behavior. Different jobs (whether run by the same application or by different applications) may result in workloads having very different application performance counters and hence different fingerprints. Moreover, even within a given job, different workloads corresponding to different portions of the job could have different fingerprints. On the other hand, two different applications and/or different jobs could present workloads that have similar fingerprints.

Workloads that have identical or similar workload-specific fingerprints may be classified together as part of the same workload class, and thus may be grouped together in the architecture-specific knowledge database. For example, if a clustering ML technique is used, the workloads having similar workload-specific fingerprints may be grouped together to form a cluster or performance group. The workload class (e.g., cluster) may have its own characteristic fingerprint determined for it (e.g., as an average of the fingerprints of cluster members) and this class fingerprint may be stored in the database. In some aspects, a mean shift algorithm may be utilized by the ML technique to cluster workloads into appropriate performance groups, with each cluster/performance group having an associated range of values (derived from the cluster member workloads) for a plurality of workload performance profiling counters. The plurality of workload performance profiling counters and their respective range of values within a cluster may comprise a cluster fingerprint.

As noted above, the system may also determine optimal settings of hardware parameters for the workload classes. In some implementations of the technology described herein, an unsupervised ML technique is used not only to classify HPC applications/workloads but also to determine optimal execution parameters (i.e., settings for tunable hardware execution parameters) for workloads in view of various optimization metrics. During the ML training, one or more of the tunable hardware execution parameters present in the HPC system may be varied as a workload is executed, and/or across different executions of workloads, and the effects on various system performance characteristics of interest (e.g., power consumption, number of instructions executed, etc.) may be noted for each combination of settings. This allows the optimal collection of settings to be identified, in view of the optimization metrics, for each of the workload classes. The optimal settings in view of the optimization metrics may be stored in the architecture-specific database. Once workloads are clustered into performance groups, the optimal setting values for the member workloads of a performance group may be aggregated and a mathematical function (e.g., an average) may be applied to the aggregated setting values to determine the optimal settings for the tunable hardware execution parameters under a given optimization metric for the workloads comprising the cluster.

Once the system is trained as set forth above, for any workload executed in the HPC system, workload performance profiling counters may be collected, and the workload may be classified by determining a workload-specific fingerprint for the workload. The workload-specific fingerprint for the workload may be compared to the range of values for the cluster fingerprints of the performance groups/clusters stored in the architecture-specific knowledge database. Based on determining that the workload-specific fingerprint aligns with a cluster fingerprint for a performance group/cluster within the architecture-specific knowledge database, the tunable hardware execution parameters may be set to the optimal settings stored in the database for the matching cluster to achieve optimal execution of the workload under a given optimization metric.

In some aspects, the tunable hardware execution parameters may be set to the optimal settings stored in the database for the matching cluster for each of a plurality of nodes running the workload. As used herein, a "node" generally refers to a computing element. The nodes of an HPC system may be computer systems (e.g., clients, servers, or peers) in virtual or physical form, one or more components of a computer system, computing elements, compute engines, hardware devices, software entities or processes, or a combination thereof. Non-limiting examples of nodes include a software process (e.g., a client or a server), a virtual machine, a virtual controller of a storage software stack, a storage server, a hyperconverged platform, a data virtualization platform, a sensor, or an actuator. In some aspects, the workload-specific fingerprint for the workload may be added to the aligned cluster in the architecture-specific knowledge database.

Based on determining that the workload-specific fingerprint does not align with a cluster fingerprint for a performance group/cluster within the architecture-specific knowledge database, the current settings for the tunable hardware execution parameters may be maintained (e.g., for instance, where there are heterogenous nodes running the workload) or the technology of the present disclosure may determine the optimal settings for a plurality of tunable hardware execution parameters as the workload is running (and given an optimization metric for which to optimize execution) and the optimal settings may be stored with the optimization metric and the workload-specific fingerprint in the architecture-specific knowledge database. This real-time determination of the optimal settings for tunable hardware execution parameters may be well suited for applications, for instance, which include homogenous nodes running the workload.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

FIG. 1 is a block diagram of a system 100 in accordance with some implementations of the present disclosure. The system 100 may include an HPC system 102 and a site- or architecture-specific knowledge database 104.

The HPC system 102 includes a runtime environment optimizer 106 that is configured to optimize the runtime environment during running of workloads utilizing the HPC system 102 and a plurality of nodes 108 (e.g., 108a-108e, each node of the plurality being configured to be utilized during running of workloads using the HPC system. The runtime environment optimizer 106 may be part of the HPC system 102, as shown in FIG. 1, or it may be provided as part of a separate system that is in communication with the HPC system 102.

The runtime environment optimizer 106 comprises a storage medium 110 and processing circuitry 112. The processing circuitry 112 comprises at least one processor, which may comprise a central processing unit (CPU), system-on-chip (Soc), microprocessor, or any other processing resource or device capable of executing instructions. The storage medium 110 stores instructions executable by the processing circuitry 112 to perform operations described below. The runtime environment optimizer 106 uses an unsupervised machine learning (ML) technique (e.g., clustering) to identify optimal settings for tunable hardware execution parameters of the HPC 102. In particular, the same instructions stored in the storage medium 110 include training phase instructions 114 to be executed during a training phase (e.g., to populate the site- or architecture-specific knowledge database 104) and parameter optimization instructions 116 to be executed after the training phase has been completed to optimize a runtime environment for a current workload being run on the HPC system 102. The operations associated with the training phase instructions 114 and the parameter optimization instructions 116 are described in greater detail below with reference to FIGS. 2 and 3, respectively. Although FIG. 1 illustrates an example in which the training phase instructions 114 and the parameter optimization instructions 116 are both part of the same runtime environment optimizer 106 executed on the same system, in other examples these instructions could be stored and performed on separate systems (e.g., one system may perform the training phase instructions to build up the architecture-specific knowledge database 104 and then one or more other systems may perform the parameter optimization instructions 116 as and when needed using the architecture-specific knowledge database 104 built up by the first system).

The site- or architecture-specific knowledge database 104 is configured to store data that is specific to the architecture of the HPC system 102 with which it is associated. Such data may include, without limitation, the identity of tunable hardware execution parameters, optimal settings for tunable hardware execution parameters, optimization metrics, optimal settings for tunable hardware execution parameters as measured against various optimization metrics, workload performance profiling counters, and application/workload fingerprints. The site- or architecture-specific knowledge database 104 may be external to the HPC system 102 and/or external to the runtime environment optimizer 106 in some examples. In other examples, the site- or architecture-specific knowledge database 104 may be part of the HPC system 102 and/or the runtime environment optimizer 106.

Figure 2:
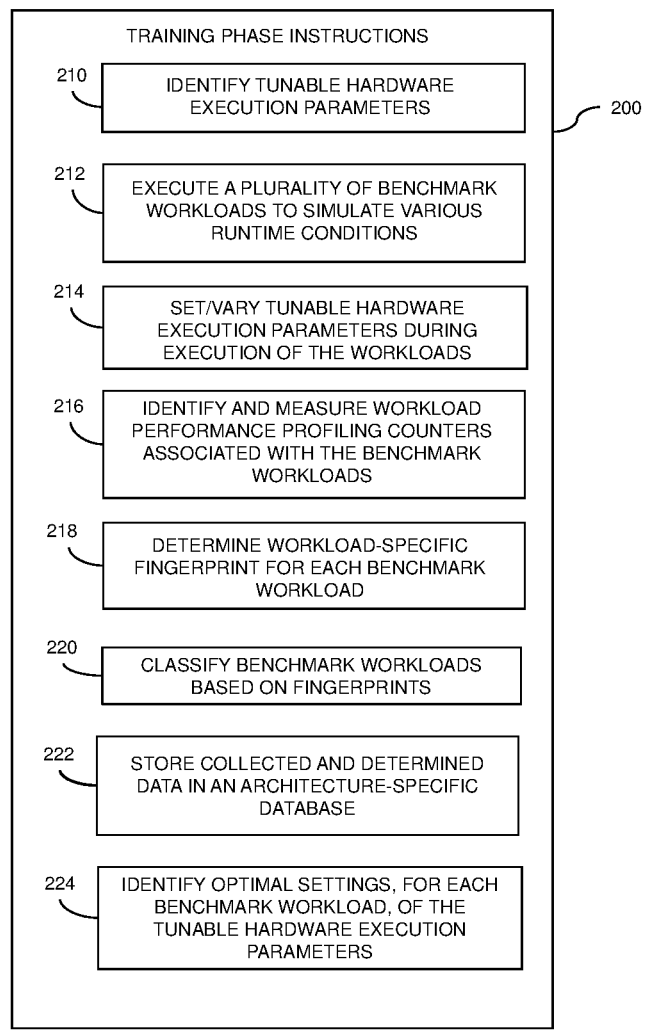
FIG. 2 is a block diagram showing the training phase instructions of an example HPC system in accordance with some implementations of the present disclosure.

FIG. 2 is a block diagram showing training phase instructions 200 of an example HPC system in accordance with some implementations of the present disclosure. Training phase instructions 200 may be an example of training phase instructions 112 of FIG. 1. During the training phase for the ML technique, block 210 causes the HPC system to identify tunable hardware execution parameters that are to be used during training. These tunable hardware execution parameters may include at least some (e.g., at least two) of the tunable hardware execution parameters available in the system. In some examples, the training phase instructions 200 may identify a predetermined set of tunable hardware execution parameters for use in the training. In some examples, a user may specify tunable hardware execution parameters to use and the training phase instructions 200 may be configured to receive such user input and use it to identify the tunable hardware execution parameters for use in the training accordingly. In some examples, as part of identifying the tunable hardware execution parameters, the training phase instructions 110 may be configured to scan the HPC system 100 to determine which tunable hardware execution parameters are available Block 212 causes the HPC system to, during the training phase for the ML technique, execute a plurality of benchmark workloads to simulate various runtime conditions.

Block 214 causes the HPC system to, during the runtime of each benchmark workload, set the tunable hardware execution parameters identified for use in training to particular values, and these values may be varied from one benchmark run to another. In some examples, the same workload may be run multiple times with different parameter settings each time. The values of the tunable hardware execution parameters used for each benchmark workload may be stored (e.g., in the architecture-specific knowledge database 106 of FIG. 1 or elsewhere) for use in subsequent operations. In addition, system performance characteristics may be measured during each of the benchmark workloads. The performance characteristics may be associated with one or more optimization metrics, and may include at least one of power consumption, a number of instructions executed, flops, time of completion for a job, or other similar system performance characteristics.

Block 216 causes the HPC system, to identify and measure workload performance profiling counters associated with the simulated workload to assist in identifying and/or classifying at least one of a workload, the performance of a workload, and the power consumption of a workload. By way of example, and not limitation, workload performance profiling counters may include a cache-hits counter, a cache-misses counter, a translation look asides counter, a buffer hits counter, a buffer misses counter, a memory stores counter, a memory load counter, a loads to stores ratio counter, a power consumption counter, and/or a flops counter. The counters may count or quantify the associated underlying phenomena in a variety of ways as would be familiar to those of ordinary skill in the art. For example, a cache-hit counter counts or quantifies cache hits and may do so using a variety of statistical measures, including, for example, a total number of cache hits throughout the performance of the workload or some defined portion thereof, an average number of cache hits per unit time during the performance of the workload, a lowest number of cache hits per unit time, a peak number of cache hits per unit of time, and so on. The other counters noted above may similarly count or quantify their respective underlying phenomenon using a variety of statistical measures in an analogous manner to the cache-hits described above.

The counters identified in block 216 may be predetermined counters, may be user-specified (e.g., from among a predetermined set of choices), or may be determined dynamically based on analyzing the workloads using ML techniques to identify which counters can be most useful in characterizing workloads. The identified counters may be measured during each run of the benchmark workloads, and this information may be stored (e.g., in the architecture-specific knowledge database 106 of FIG. 1 or elsewhere).

Block 218 causes the HPC system to determine a workload-specific fingerprint for each benchmark workload based on the identified and measured performance counters. Determining the workload-specific fingerprint may include using a machine learning (ML) technique to classify the workload. A workload-specific fingerprint may classify a workload according to its measured performance (presented as one or more values) in terms of a plurality of workload performance profiling counters during certain runtime conditions. While not specifically identifying a workload, a workload-specific fingerprint may be utilized to classify a workload based on its behavior during runtime of a particular workload.

Block 220 causes the HPC system to classify the benchmark workloads based on their fingerprints (which are based on the measured workload performance profiling counters), wherein workloads that have identical or similar workload-specific fingerprints may be classified as being part of the same class or cluster or performance group. For example, the HPC system may utilize a clustering technique to identify clusters of fingerprints. In some implementations, a mean shift algorithm may be utilized by the ML technique to cluster workloads into appropriate performance groups, with each cluster/performance group having an associated range of values (derived from the cluster member workloads) for a plurality of workload performance profiling counters. The plurality of workload performance profiling counters and their respective range of values within a cluster may comprise a cluster fingerprint. The cluster fingerprint and/or other information characterizing the class may be stored within an architecture-specific knowledge database. In some examples, information associated with individual workloads (e.g., workload-specific fingerprints) may also be stored in the database.

Although not illustrated in FIG. 2, the instructions 200 may include instructions to update and reorganize the workload classes as needed as new information is obtained. For example, if a given workload-specific fingerprint is determined that does not match any as-yet identified classes, then a new class may be defined based on the workload-specific fingerprint. As another example, if a given workload-specific fingerprint is identified that fits within an existing class, then the class may be updated to reflect the workload-specific fingerprint. For example, in the context of clustering, based on determining that the workload-specific fingerprint of one or more benchmark workloads aligns with a performance group/cluster the HPC system may add the workload-specific fingerprint(s) to the cluster(s). If appropriate, the HPC system may update the performance group(s)/cluster(s) data with the workload-specific fingerprint data of the matching workload-specific fingerprint(s) of the one or more benchmark workloads.

Block 222 causes the HPC system to store all the collected, identified, and determined data (i.e., that collected, identified, and determined at blocks 210, 212, 214, 216, and 218), for example in the architecture-specific knowledge database 106 of FIG. 1.

Block 224 causes the HPC system to identify, for each of the workload classes (e.g., clusters) and for a given optimization metric, optimal settings for the tunable hardware execution parameters identified in step 210. In particular, the system performance information measured during the performance of the benchmark workloads, together with the settings information stored for each of the workloads, can be used to identify which particular combination of settings resulted in the best performance as defined by the given optimization metric. In some examples, multiple sets of optimal settings may be determined for each workload class, one set for each of multiple possible optimization metrics. This may allow a user to select one of the multiple possible optimization metrics and obtain optimal settings specifically for that policy. In other examples, a single optimization metric may be assumed, and optimal settings may be determined just for that one optimization metric. Examples of optimization metrics include optimal energy efficiency (e.g., measured in instructions per watt), minimal energy/power consumption (for instance, given a particular workload performance floor), maximum workload performance (for instance, given a particular power cap), and minimum workload runtime.

Once the optimizer 104 is trained (i.e., the architecture-specific knowledge database 106 is populated with information identifying classes of workloads with associated optimal hardware settings for one or more optimization metrics), the HPC system 102 may run workloads in the normal fashion. As the workloads are run, the parameter optimization instructions 114 may be executed to cause the optimizer 104 to optimize the runtime environment for the currently running application/workload.

Figure 3:
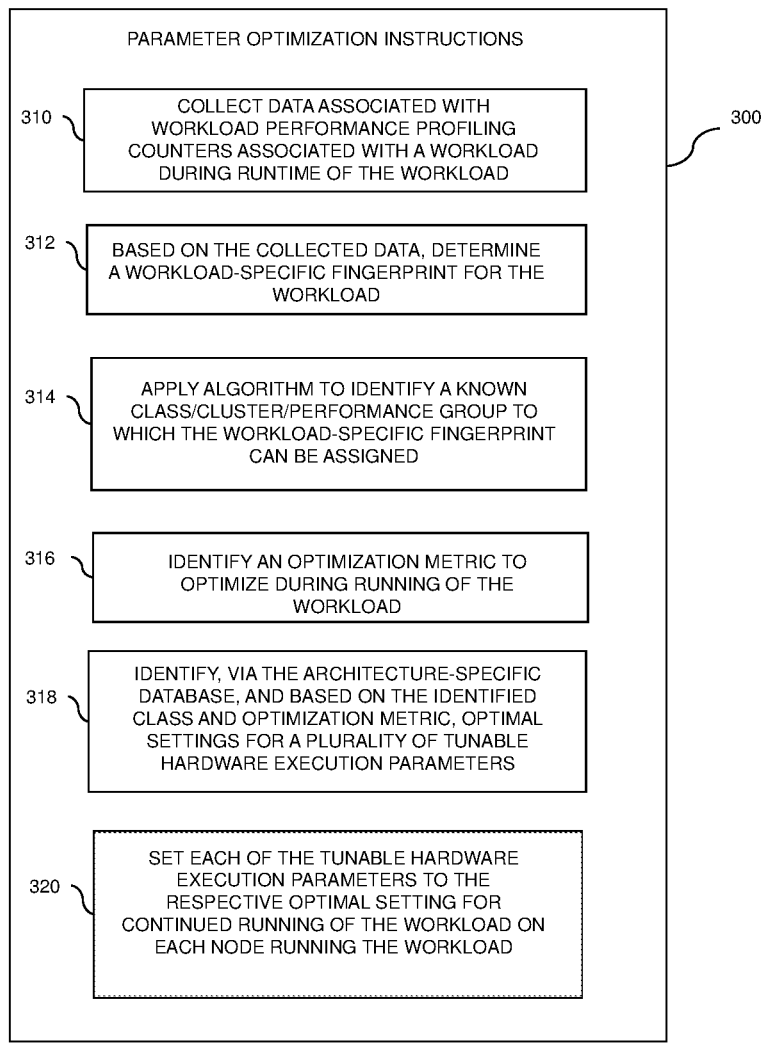
FIG. 3 is a block diagram showing the parameter optimization instructions of an example computing system.

FIG. 3 illustrates parameter optimization instructions 300 in greater detail. Parameter optimization instructions 300 may be an example of parameter optimization instructions 114 of FIG. 1.

Block 310 causes an HPC system, as a workload begins to execute on the nodes of the HPC system (e.g., as workload 116 begins to execute on the nodes 108a, 108b, 108c, 108d, 108e of the HPC system 102 of FIG. 1) to collect data associated with workload performance profiling counters associated with the workload during runtime of the workload. The data associated with the plurality of workload performance profiling counters may include, by way of example and not limitation, an identification of the plurality of workload performance profiling counters and one or more respective values for each given certain runtime conditions. In particular, the workload performance profiling counters may include some or all of the workload performance profiling counters mentioned above that were used in the training phase.

Block 312 causes the HPC system to determine, based on the collected workload performance profiling counters, a workload-specific fingerprint for the workload. Determining the workload-specific fingerprint may include using a machine learning (ML) technique to classify the workload (i.e., determine the appropriate workload-specific fingerprint), in a manner similar to that described above in relation to the benchmark workloads. In some implementations, the mean shift algorithm may be utilized to classify the workload.

The parameter optimization instructions 112 further may be configured to cause the optimizer 101 to apply an algorithm to identify a known class/cluster/performance group, as specified in the architecture-specific knowledge database 116, to which the workload-specific fingerprint may be assigned.

Block 316 causes the HPC system to identify an optimization metric to optimize during running of the workload. In some aspects, an optimization metric for which optimization is desired is provided by the workload and/or the executor or provider of the workload. In other examples, an optimization metric is predetermined in advance.

Block 318 causes the HPC system to identify, via the architecture-specific knowledge database (e.g., the architecture-specific database 106 of FIG. 1), and based on the identified class (e.g., in block 314) and the identified optimization metric (e.g., in block 316), optimal settings for a plurality of tunable hardware execution parameters in view of the optimization metric. In some aspects, the optimal settings for the plurality of tunable hardware execution parameters may be identified by looking up the optimal settings for the plurality of tunable hardware execution parameters, in view of the identified optimization metric, stored in association with the cluster(s) with which a workload-specific fingerprint aligns.

Block 320 causes the HPC system to set each of the tunable hardware execution parameters to the respective optimal setting for the continued running of the workload 18 on each node running the workload.

Figure 4:
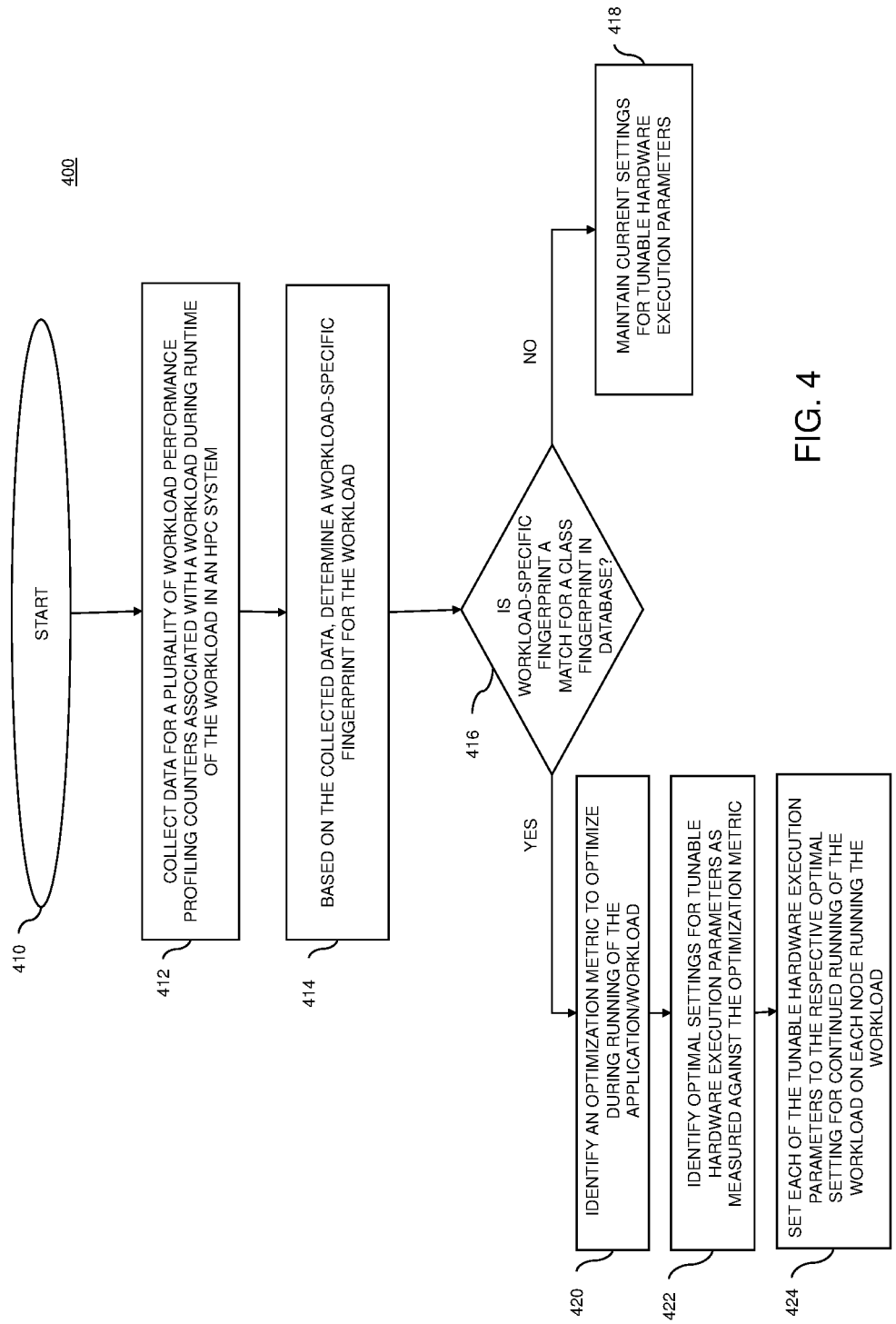
FIG. 4 is a flow diagram showing an illustrative method for optimizing the operation of HPC systems having, e.g., heterogenous nodes, in accordance with an example implementation of the present disclosure.

FIG. 4 is a flow diagram depicting an example method 400 for optimizing the operation of high-performance computing systems. The method 400 may be performed, for example, by the system 100 described above. For example, the runtime environment optimizer 104 may include instructions to perform the operations associated with the method. In some circumstances, the method 400 may be well suited to HPC systems having, e.g., heterogenous nodes, in accordance with example implementations of the present disclosure. The method 400 begins at step 410 and continues to step 412. At step 412, data may be collected that is associated with a plurality of workload performance profiling counters associated with a workload during runtime of the workload in an HPC system. The data associated with the plurality of workload performance profiling counters may include, by way of example and not limitation, an identification of the plurality of workload performance profiling counters and one or more respective values for each given certain runtime conditions.

At step 414, based on the collected data, a workload-specific fingerprint for the workload may be determined. Determining the workload-specific fingerprint may include using a machine learning (ML) technique to classify the workload (i.e., determine the appropriate workload-specific fingerprint).

At step 416, it may be determined whether the determined workload-specific fingerprint matches or aligns with one or more cluster fingerprints that are present in the architecture-specific database. In this regard, the workload-specific fingerprint for the workload may be compared to the range of values for the cluster fingerprints of the performance groups/clusters stored in the architecture-specific knowledge database to determine whether the workload-specific fingerprint aligns with any of the cluster fingerprint ranges.

If it is determined at step 416 that the workload-specific fingerprint is not a match for any class fingerprints present in the architecture-specific database (i.e., does not align with any of the cluster fingerprint ranges), the current settings for the tunable hardware execution parameters may be maintained, as shown in step 418. If it is determined at step 416 that the workload-specific fingerprint does match a class fingerprint present in the architecture-specific database (i.e., the workload-specific fingerprint does align with one or more cluster fingerprint ranges located in the architecture-specific database), an optimization metric to optimize during the running of the workload in the HPC system may be identified, as shown in step 420. In some implementations, an optimization metric for which optimization is desired is provided by the workload and/or the executor or provider of the workload.

At step 422, optimal settings for a plurality of tunable hardware execution parameters may be identified in view of the optimization metric. In some implementations, the optimal settings for the plurality of tunable hardware execution parameters may be identified by looking up the optimal settings for the plurality of tunable hardware execution parameters, in view of the identified optimization metric, stored in association with the cluster(s) with which a workload-specific fingerprint aligns.

At step 424, each of the tunable hardware execution parameters may be set to the respective optimal setting for the continued running of the workload on each node running the workload in the HPC system.

Figure 5:
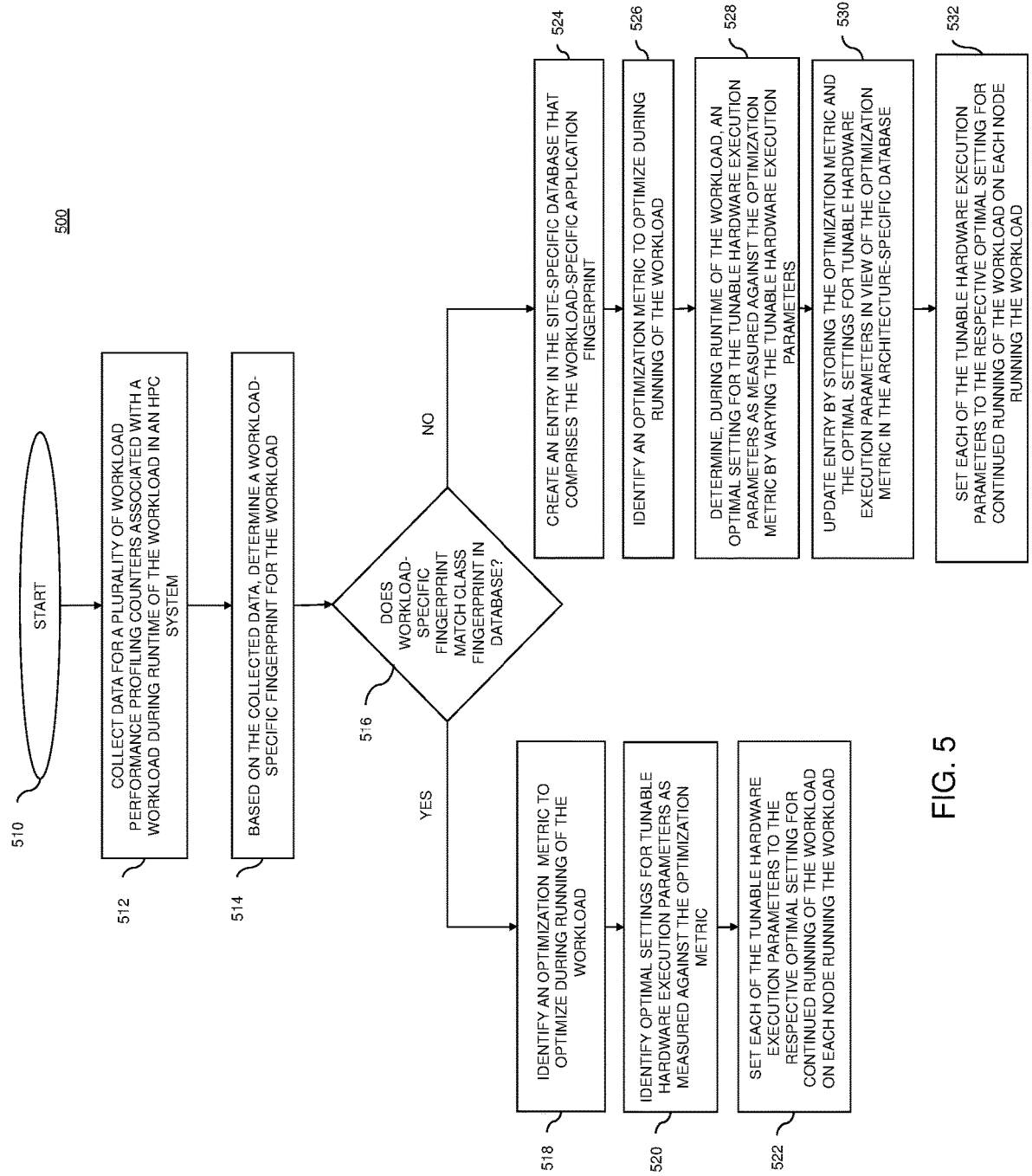
FIG. 5 is a flow diagram depicting an illustrative method for optimizing the operation of HPC systems having, e.g., homogenous nodes, in accordance with an example implementation of the present disclosure.

FIG. 5 is a flow diagram depicting an example method for optimizing the operation of high-performance computing systems. The method 500 may be performed, for example, by the system 100 described above. For example, the runtime environment optimizer 104 may include instructions to perform the operations associated with the method. In some circumstances, the method 500 may be well suited to HPC systems having, e.g., homogenous nodes, in accordance with example implementations of the present disclosure. The method 500 begins at step 510 and continues to step 512. At step 512, data is collected for a plurality of workload performance profiling counters associated with a workload during runtime of the workload in an HPC system. The data associated with the plurality of workload performance profiling counters may include, by way of example and not limitation, an identification of the plurality of workload performance profiling counters and one or more respective values for each given certain runtime conditions.

At step 514, based on the collected data, a workload-specific fingerprint for the workload may be determined. Determining the workload-specific fingerprint may include using a machine learning (ML) technique to classify the workload (i.e., determine the appropriate workload-specific fingerprint).

At step 516, it may be determined whether the determined workload-specific fingerprint matches (aligns with one) or more cluster fingerprints that are present in the architecture-specific database. In this regard, the workload-specific fingerprint for the workload may be compared to the range of values for the cluster fingerprints of the performance groups/clusters stored in the architecture-specific knowledge database to determine whether the workload-specific fingerprint aligns with any of the cluster fingerprint ranges.

If it is determined at step 516 that the workload-specific fingerprint is present in the architecture-specific database (i.e., the workload-specific fingerprint does align with one or more cluster fingerprint ranges located in the architecture-specific database), an optimization metric to optimize during the running of the workload in the HPC system may be identified, as shown in step 518. In some aspects, an optimization metric for which optimization is desired is provided by the workload and/or the executor or provider of the workload.

As shown in step 520, optimal settings for a plurality of tunable hardware execution parameters may be identified in view of the optimization metric. In some aspects, the optimal settings for the plurality of tunable hardware execution parameters may be identified by looking up the optimal settings for the plurality of tunable hardware execution parameters, in view of the identified optimization metric, which are stored in association with the cluster(s) with which a workload-specific fingerprint aligns.

As shown in step 522, each of the tunable hardware execution parameters may be set to the respective optimal setting for the continued running of the workload on each node running the workload in the HPC system.

If it is determined at step 516 that the workload-specific fingerprint is not in the architecture-specific database (i.e., the workload-specific fingerprint does align with one or more cluster fingerprint ranges located in the architecture-specific database), an entry may be created in the architecture-specific knowledge database that comprises the workload-specific fingerprint, as shown at step 524.

At step 526, an optimization metric to optimize during the running of the workload in the HPC system may be identified. In some implementations, an optimization metric for which optimization is desired is provided by the workload and/or the executor or provider of the workload.

At step 528, during runtime of the workload, an optimal setting for the tunable hardware execution parameters may be determined in view of the optimization metric by modifying or tuning the setting(s) of one or more of the tunable hardware execution parameters, noting the effect of such modification(s) on the performance of the workload (as measured by the optimization metric for which optimization is desired), and selecting the setting that delivers the best performance.

At step 530, the database entry may be updated by storing the optimization metric and the optimal settings for the tunable hardware execution parameters in view of the optimization metric in the architecture-specific knowledge database.

At step 532, each of the tunable hardware execution parameters may be set to the respective optimal setting for the continued running of the workload on each node running the workload in the HPC system.

The method 500 may differ from the method 400 in that, among other things, when no longer in the training phase, the method 400 does not identify new classes for workloads that do not match existing classes or determine optimal parameter settings for such workloads, whereas the method 500 does. The method 400 may avoid the processing overhead that may be associated with identifying a new class and determining optimal settings for that class, but at the cost of possibly leaving some workloads unoptimized. On the other hand, the method 500 may allow for optimization of all workloads but may occasionally entail a processing overhead penalty when a new class of workload is encountered.

Figure 6:
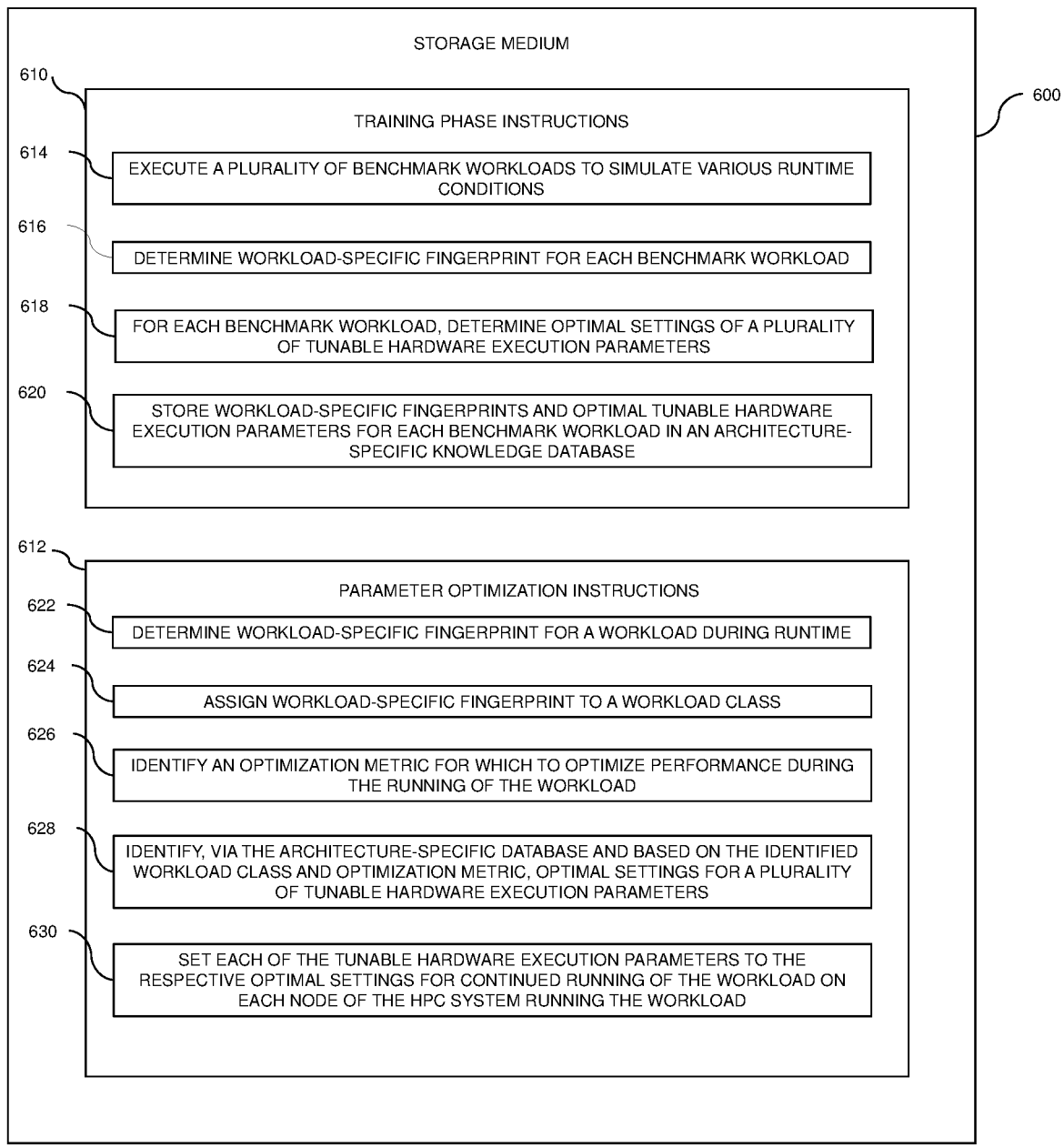
FIG. 6 is a block diagram showing an example computer program product 600 (i.e., a computer-readable medium storing instructions), in accordance with some implementations of the present disclosure.

FIG. 6 is a block diagram showing an example computer program product 600 (i.e., a computer-readable medium storing instructions), in accordance with some implementations of the present disclosure. The computer-readable storage medium 600 includes training phase instructions 610 and parameter optimization instructions 612. The training phase instructions 610 may be similar to the training phase instructions 110 described above with regard to FIG. 1. The parameter optimization instructions 612 may be similar to the parameter optimization instructions 114 described above with regard to FIG. 1.

Block 614 of the training phase instructions 610 causes the HPC system to execute a plurality of benchmark workloads to simulate various runtime conditions. Block 616 of the training phase instructions 610 causes the HPC system to determine a workload-specific fingerprint for each benchmark workload, for instance, based on identifying and measuring workload performance profiling counters associated with the benchmark workloads. Block 618 of the training phase instructions 610 causes the HPC system to identify optimal settings, for each benchmark workload, of a plurality of tunable hardware execution parameters identified as being present during the execution of each benchmark workload. Block 620 of the training phase instructions causes the HPC system to store the workload-specific fingerprints and the optimal tunable hardware execution parameters for each benchmark workload in association with an architecture-specific knowledge database (e.g., the architecture-specific knowledge database 106 of FIG. 1).

Block 622 of the parameter optimization instructions 614 causes the HPC system to determine a workload-specific fingerprint for a workload during runtime of the workload. Block 624 of the parameter optimization instructions 614 causes the HPC system to assign the workload-specific fingerprint to a workload class/cluster/performance group using, for instance, the mean shift algorithm. Block 626 of the parameter optimization instructions 614 causes the HPC system to identify an optimization metric for which to optimize performance during the running of the workload. Block 628 of the parameter optimization instructions 614 causes the HPC system to identify, via the architecture-specific database and based on the identified workload class and optimization metric, optimal settings for a plurality of tunable hardware execution parameters. Block 630 of the parameter optimization instructions 614 causes the HPC system to set each of the tunable hardware execution parameters to the respective optimal settings for continued running of the workload on each node of the HPC system running the workload.

The processing described herein with reference to FIGS. 1 through 5 may be implemented in the form of executable instructions stored on a machine-readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more computing systems or nodes of various forms, such as the systems described above with reference to FIGS. 1, 2, and 3.

The technology described herein includes various steps, examples of which have been described above. As described further above, these steps may be performed by hardware components or may be embodied in machine-executable instructions, which may be used to cause a processor programmed with the instructions to perform the steps. A processor being programmed to perform operations means that the processor is communicably coupled to a non-transitory machine readable medium that stores instructions that are executable by the processor to cause the processor to perform the operations, but this does not necessarily require that the instructions have been so executed or that they have been loaded into memory for execution. Alternatively, at least some steps may be performed by a combination of hardware, software, and/or firmware.

The technology described herein may be provided as a computer program product, which may include a tangible machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

In the technical description herein, numerous specific details are set forth in order to provide a thorough understanding of example implementations. It will be apparent, however, to one skilled in the art that implementations described herein may be practiced without some of these specific details. In other instances, well-known structures and devices are shown in block diagram form.

The terminology used herein is for the purpose of describing example implementations only and is not intended to be limiting. As used herein, the singular forms "a," "an," and "the" are intended to include the plural forms as well, unless the context clearly indicates otherwise. The term "plurality," as used herein, is defined as two, or more than two. The term "and/or" as used herein refers to and encompasses any and all possible combinations of one or more of the associated listed items. As used herein, the term "includes" means includes but not limited to, and the term "including" means including but not limited to. The term "based on" means based at least in part on. If the specification states a component or feature "may," "can," "could," or "might" be included or have a characteristic, that particular component or feature is not required to be included or have the characteristic. As used in the description herein, the meaning of "in" includes "in" and "on" unless the context clearly dictates otherwise.

As used herein, the term "application" refers to a program designed to perform one or more tasks. For example, a facial recognition application may perform a task of recognizing faces in images; a mathematical solver application may perform a task of solving a mathematical problem; a pattern recognition application may perform a task of finding patterns in a data set, and so on. The term "job" refers to a particular instance of a task that is to be performed, is being performed, or has been performed by an application using a particular set of inputs/data. For example, for a facial recognition application, a job may constitute analyzing a particular set of data (e.g., one or more images) to generate a particular output (e.g., identification of a face). The term "workload" refers to the computing operations performed by and the hardware states of an HPC system resulting from an application running on the system performing a task (or a portion of a task).

Various methods described herein may be practiced by combining one or more machine-readable storage media containing the code according to example embodiments described herein with appropriate standard computer hardware to execute the code contained therein. An apparatus for practicing various embodiments described herein may involve one or more computing elements or computers (or one or more processors within a single computer) and storage systems containing or having network access to computer program(s) coded in accordance with various methods described herein, and the method steps of various embodiments described herein may be accomplished by modules, routines, subroutines, or subparts of a computer program product.

In the foregoing description, numerous details are set forth to provide an understanding of the subject matter disclosed herein. However, implementations may be practiced without some or all these details. Other implementations may include modifications and variations from the details discussed above. It is intended that the following claims cover such modifications and variations.

What is claimed is:

1. A system comprising:
at least one processor programmed to:
collect data associated with a plurality of workload performance profiling counters associated with a workload during one or more executions of the workload in a High Performance Computing (HPC) system comprising multiple nodes each having a plurality of tunable hardware execution parameters;
store, in an architecture-specific knowledge database, a class fingerprint for a workload class of which the workload is a member, the class fingerprint being based on a workload-specific fingerprint of the workload according to a machine-learning (ML) technique, the workload-specific fingerprint being based on the collected data;
store in the architecture-specific knowledge database, in association with the class fingerprint, optimal settings for the plurality of tunable hardware execution parameters measured against a specified optimization metric based on at least one variation of at least a portion of the plurality of tunable hardware execution parameters in the HPC system during the one or more executions of the workload; and
during an initial execution of a given workload on a given HPC system, vary the plurality of tunable hardware execution parameters of each node of the given HPC system that is executing the workload to the optimal settings stored in the architecture-specific knowledge database in association with the class fingerprint for continued execution of the given workload on the given HPC system resulting in improved execution of the given workload relative to the initial execution, wherein the given HPC system is the HPC system or another HPC system, wherein the given workload is the workload or another workload, and wherein the given workload has a workload-specific fingerprint corresponding to the class fingerprint.

2. The system of claim 1, wherein the plurality of workload performance profiling counters identify at least one of the workload, performance of the workload, or power consumption of the workload.

3. The system of claim 1, wherein the plurality of workload performance profiling counters comprises at least one of a cache-hits counter, a cache-misses counter, a translation look asides counter, a buffer hits counter, a buffer misses counter, a memory stores counter, a memory load counter, a loads to stores ratio counter, a power consumption counter, or a flops counter.

4. The system of claim 1, wherein the optimization metric comprises at least one of optimal energy efficiency, minimal energy/power consumption, maximum workload performance, or minimum workload runtime.

5. The system of claim 1, wherein the plurality of tunable hardware execution parameters affect performance of the HPC system.

6. The system of claim 1, wherein the plurality of tunable hardware execution parameters comprises at least two of Central Processing Unit (CPU) frequency, CPU cache memory frequency, CPU voltage, system memory frequency, system memory timings, system memory voltage, Graphical Processing Unit (GPU) frequency, GPU memory frequency, GPU voltage, Tensor Processing Unit (TPU)

frequency, TPU memory frequency, TPU Voltage, one or more kernel parameters, or a direct power cap.

7. The system of claim 1, further comprising using the ML technique for the collecting of data associated with the plurality of workload performance profiling counters associated with the workload, wherein the optimal settings for the plurality of tunable hardware execution parameters measured against the optimization metric are based on the ML technique.

8. The system of claim 1, wherein the ML technique comprises at least one of clustering, a deep neural network, or a random decision forest.

9. A method comprising:
collecting data associated with a plurality of workload performance profiling counters associated with a workload during one or more executions of the workload in a High Performance Computing (HPC) system comprising multiple nodes each having a plurality of tunable hardware execution parameters; and
in response to a workload-specific fingerprint of the workload matching an entry comprising a class fingerprint corresponding to the workload-specific fingerprint stored an architecture-specific knowledge database, during an initial execution of the workload in the HPC system, varying the plurality of tunable hardware execution parameters of each node of the given HPC system that is executing the workload to optimal settings for the plurality of tunable hardware execution parameters stored in the entry of the architecture-specific knowledge database in association with the class fingerprint for continued execution of the workload on the HPC system according to a specified optimization metric resulting in improved execution of the workload relative to the initial execution,
wherein the workload-specific fingerprint is based on the collected data, the class fingerprint is based on a workload-specific fingerprint of the workload according to a machine-learning (ML) technique, and the class fingerprint being for a workload class of which the workload is a member.

10. The method of claim 9, wherein the plurality of workload performance profiling counters comprises at least one of a cache-hits counter, a cache-misses counter, a translation look asides counter, a buffer hits counter, a buffer misses counter, a memory stores counter, a memory load counter, a loads to stores ratio counter, a power consumption counter, or a flops counter.

11. The method of claim 9, wherein the plurality of workload performance profiling counters identify at least one of the workload, performance of the workload, or power consumption of the workload.

12. The method of claim 9, wherein the optimization metric comprises at least one of optimal energy efficiency, minimal energy/power consumption, maximum workload performance, or minimum workload runtime.

13. The method of claim 9, further comprising:
receiving input specifying the optimization metric, wherein the architecture-specific knowledge database comprises a plurality of entries that store the class fingerprint in association with different groups of optimal settings for different optimization metrics, and wherein the entry is one of a plurality of entries that is associated with the optimization metric.

14. A non-transitory computer-readable medium storing instructions executable by a processor to execute operations comprising:

collecting data associated with a plurality of workload performance profiling counters associated with a workload during one or more executions of the workload in a High Performance Computing (HPC) system comprising multiple nodes each having a plurality of tunable hardware execution parameters;
in response to a workload-specific fingerprint of the workload not matching any class fingerprints stored an architecture-specific knowledge database:
creating an entry in the architecture-specific knowledge database that comprises a class fingerprint for a workload class of which the workload is a member, the class fingerprint being based on the workload-specific fingerprint according to a machine-learning (ML) technique, the workload-specific fingerprint being based on the collected data; and
updating the entry by storing, in association with the class fingerprint, an optimization metric and optimal settings for a plurality of tunable hardware execution parameters as measured against the optimization metric based on at least one variation of at least a portion of the plurality of tunable hardware execution parameters during an execution of the workload; and
during an initial execution of a given workload on a given HPC system, vary the plurality of tunable hardware execution parameters of each node of the given HPC system that is executing the workload to the optimal settings stored in the architecture-specific knowledge database in association with the class fingerprint for continued execution of the given workload on the given HPC system resulting in improved execution of the given workload relative to the initial execution, wherein the given HPC system is the HPC system or another HPC system, wherein the given workload is the workload or another workload, and wherein the given workload has a workload-specific fingerprint corresponding to the class fingerprint.

15. The non-transitory computer-readable medium of claim 14, wherein the plurality of workload performance profiling counters comprises at least one of a cache-hits counter, a cache-misses counter, a translation look asides counter, a buffer hits counter, a buffer misses counter, a memory stores counter, a loads to stores ratio counter, a power consumption counter, or a flops counter.

16. The non-transitory computer-readable medium of claim 14, wherein the plurality of workload performance profiling counters identify at least one of the workload, performance of the workload, or power consumption of the workload.

17. The non-transitory computer-readable medium of claim 14, wherein the optimization metric comprises at least one of optimal energy efficiency, minimal energy/power consumption, maximum workload performance, or minimum workload runtime.

18. The non-transitory computer-readable medium of claim 14, wherein the plurality of tunable hardware execution parameters comprises at least one of Central Processing Unit (CPU) frequency, CPU cache memory frequency, CPU voltage, system memory frequency, system memory timings, system memory voltage, Graphical Processing Unit (GPU) frequency, GPU memory frequency, GPU voltage, Tensor Processing Unit (TPU) frequency, TPU memory frequency, TPU Voltage, one or more kernel parameters, or a direct power cap.

19. The non-transitory computer-readable medium of claim 14, wherein the ML technique comprises at least one of clustering, a deep neural network, or a random decision forest.

20. The non-transitory computer-readable medium of claim 14, wherein the instructions are executable by the processor to further execute operations comprising:

creating a plurality of entries in the architecture-specific knowledge database, including the entry, that each comprise the class fingerprint, wherein the plurality of entries comprise different groups of optimal settings for different optimization metrics.

* * * * *